(12) United States Patent
Bitzer

(10) Patent No.: US 6,587,030 B2
(45) Date of Patent: Jul. 1, 2003

(54) PROCESS FOR SECURING THE PRIVACY OF DATA TRANSMISSION

(75) Inventor: Wolfgang Bitzer, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,552

(22) PCT Filed: Nov. 6, 1997

(86) PCT No.: PCT/DE97/02579

§ 371 (c)(1),
(2), (4) Date: Aug. 9, 1999

(87) PCT Pub. No.: WO98/26962

PCT Pub. Date: Jun. 25, 1998

(65) Prior Publication Data

US 2003/0102959 A1 Jun. 5, 2003

(30) Foreign Application Priority Data

Dec. 16, 1996 (DE) ............................. 196 52 256

(51) Int. Cl.[7] ........................ H04B 3/00; B60R 25/10; B60R 25/04; H01H 47/22; H04K 1/00
(52) U.S. Cl. .................... 340/5.21; 340/426; 307/10.2; 307/10.3; 380/30
(58) Field of Search .................... 340/5.21, 5.2, 340/5.1, 825, 5.72, 426; 380/30; 307/10.3, 10.5, 9.1, 10.1, 10.2

(56) References Cited

U.S. PATENT DOCUMENTS 4,965,827 A * 10/1990 McDonald .................. 380/46
5,606,615 A * 2/1997 Lapointe et al. ............ 713/185
5,684,454 A * 11/1997 Nishioka et al. .......... 123/179.2
5,734,721 A * 3/1998 Clark ......................... 180/287
5,757,085 A * 5/1998 Fischer et al. ........... 123/198 B
5,778,071 A * 7/1998 Caputo et al. .............. 375/220
5,821,631 A * 10/1998 Loraas et al. ........... 123/198 B

* cited by examiner

Primary Examiner—Brian Zimmerman
Assistant Examiner—Clara Yang
(74) Attorney, Agent, or Firm—Michael J. Striker

(57) ABSTRACT

The method of secure data transmission between an immobilizer (1) of a motor vehicle's anti-theft device and a motor control unit (2) includes storing an internal key (20') in both immobilizer and the motor control unit; generating a random bit sequence (21) from existing sensor data in the motor control unit in response to a wake-up signal (24) from the immobilizer (1); transmitting the random bit sequence from the motor control unit to the immobilizer and storing it therein; producing a key code (22) with the random bit sequence (21) and the internal key (20') in both control units; encoding a message (23) including redundant data with said key code (22) in the immobilizer; sending the message (23) to the motor control unit; reading and checking the message (23) in the motor control unit by means of the redundant data contained in the message (23) to verify correct encoding and transmitting a release signal to the motor control unit when the encoding is correct.

11 Claims, 2 Drawing Sheets

PROCESS FOR SECURING THE PRIVACY OF DATA TRANSMISSION

BACKGROUND OF THE INVENTION

1. Field of the Invention

Figure 1:
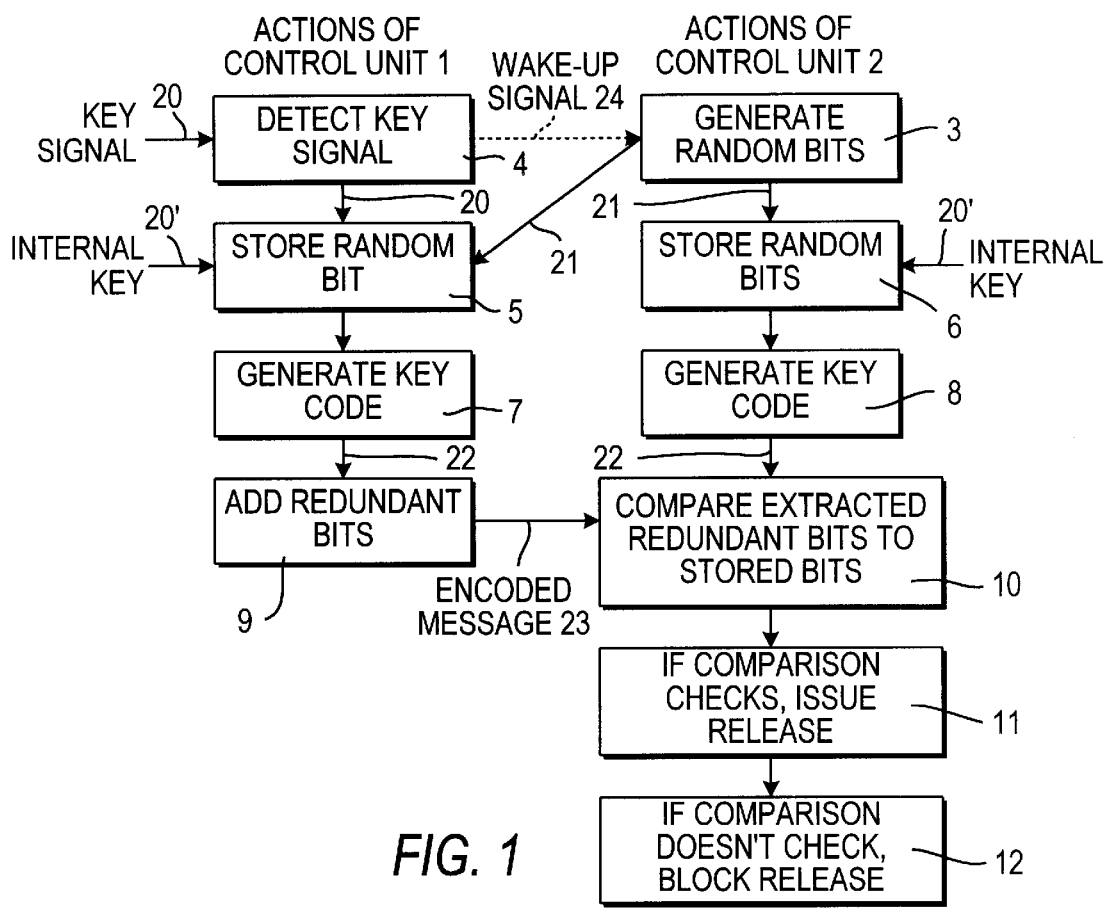

The present invention relates to a method of assuring data transmission and, more particularly, to a method of assuring data transmission between control units of a motor vehicle.

2. Prior Art

The invention is based on a method for assuring data transmission between control units in a motor vehicle, which are connected with each other by a data bus, in which one of the control units transmits a random bit sequence on the data bus, which is stored in all the control units, a key code is generated in all control units with the random bit sequence and an internal key, a data statement encoded with the key code is produced and transmitted by one of the control units, which is read and tested with the key code in the received control unit for its corrected encoding with the aid of redundant information contained in the encoded data statement.

A use of data transmission in which a particularly secure transmission of data between control units is required is known from DE 44 42 103. Said instance concerns an antitheft device for motor vehicles in which an immobilizer influences the release of a motor control device. In order to release the motor control device, a code must be input into a code reception device and the locking control-device must thereby be triggered. The data communication between the control units travels via an on-board bus. In the known prior art, the immobilizer is in fact set into operation by way of a key code that is only accessible to the user; the communication between the immobilizer control unit and a motor control unit takes place in an uncoded manner via the serial data transmission line. Since a releasing signal or locking signal of this kind is a very simple signal, which in the extreme case is comprised of one bit, such a signal can be manipulated very easily. It would be possible in such a method to feed in a manipulated signal by detaching a connecting line. A signal thus manipulated could easily be carried out by replaying a signal previously received and recorded from this transmission line.

ADVANTAGES OF THE INVENTION

The method according to the invention, with the characterizing features of the main claim has the advantage over the prior art that the data transmission between the control units takes place in an encoded form and that such a data transmission is not easy to manipulate. Thus detaching She connecting line and eavesdropping on the encoded signal transmitted via the line cannot produce successful results. Also, a replacement e.g. of the control unit for the immobilizer, as well as the replacement of the motor control unit does not produce successful results because the keys present in the devices no longer coincide. Also, the detachment and reconnection of battery voltage cannot influence the data transmission. Reading the memory of the control units and manipulating internal keys disposed in them also does not lead to any normal communication between the control units. Even the replacement in pairs of a motor control unit and a device for the immobilizer does not produce successful results since the key known only to the user is still lacking.

Advantageous improvements and updates of the method disclosed in the main claim are possible by means of the measures taken in the dependent claims. It is particularly advantageous that the communication between the control units in the form according to the invention is to be used for the security relevant communication between the control unit of an immobilizer and the control unit of a motor control.

Advantageously, the motor control obtains the random bit sequence, which represents the basis for the encoding, from sensor data present in the vehicle, which can be accessed via the data stream on the bus.

For security reasons, in order to prevent the random bit sequence from being guessed by trial and error, the random bit sequence should have a length of four bytes. Even for the length of the internal key, which is used for encoding messages between the control units, a length of at least 4 bytes is advantageous.

In order to produce a cryptogram with the key obtained, a signal byte is added bitwise modulo 2 to a first byte of the key, the result is subjected to a permutation and its result is then subjected to further additions or multiplications with the other bytes of the key byte. The resulting signal byte is comprised of the individual results of the encoding steps. The encoding method according to the invention can function with various permutation tables. In particular, the permutation can also be realized through multiplication. A increase in the security of the encoding is achieved by encoding steps that operate in parallel with one another.

DRAWINGS

Figure 2:
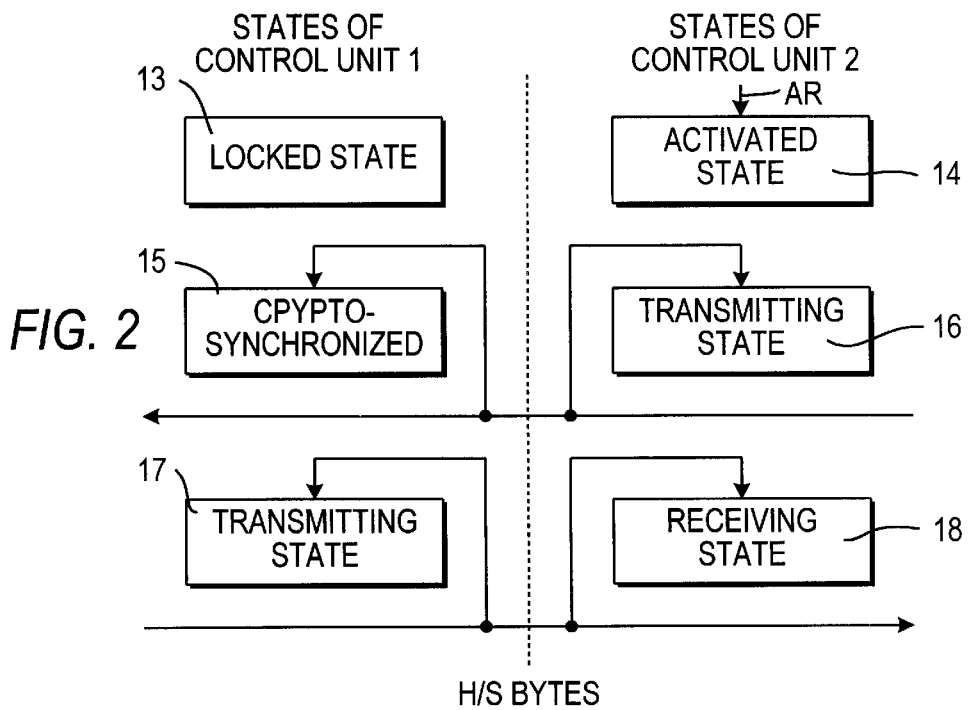
Figure 3:
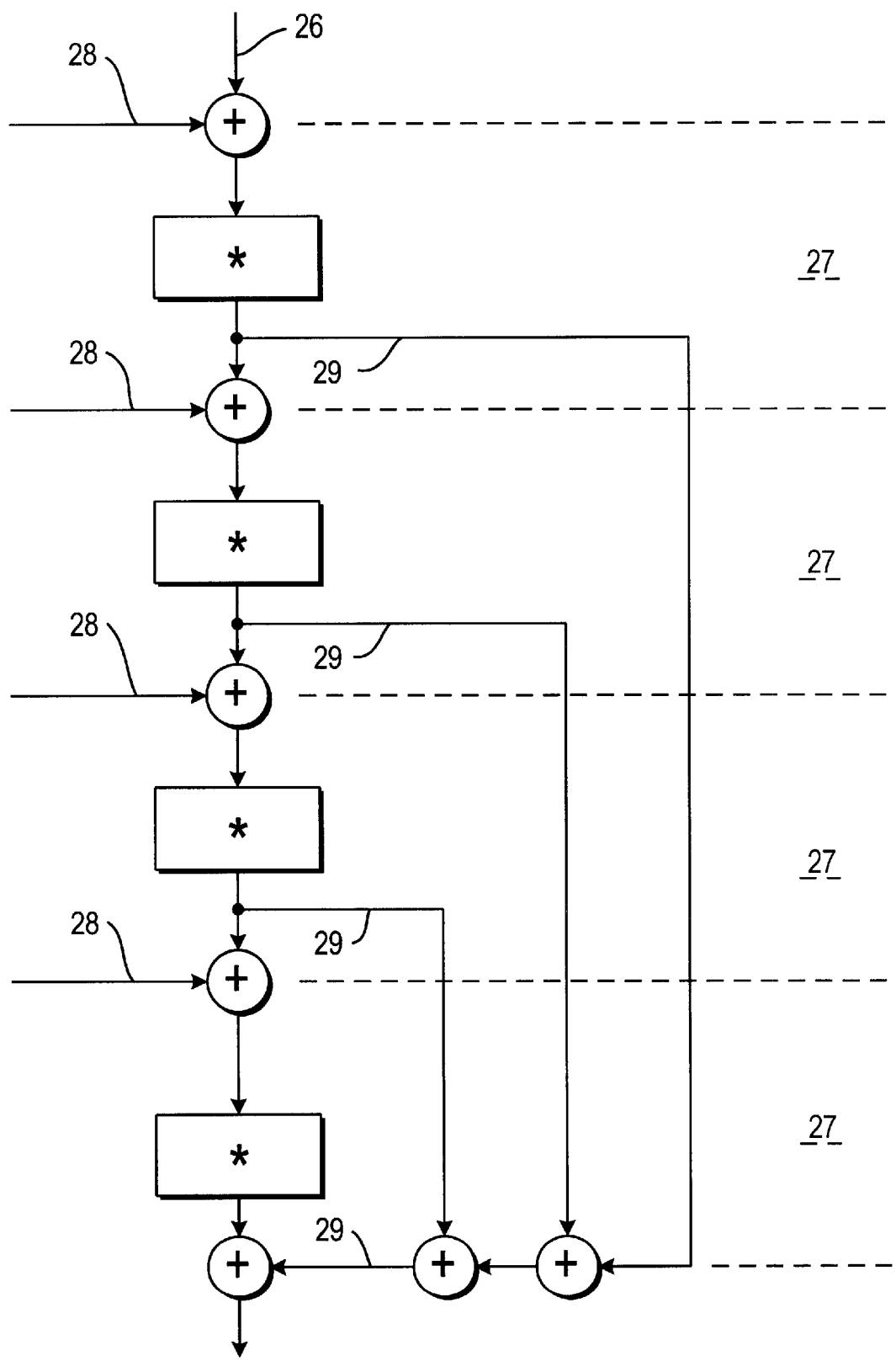

An exemplary embodiment of the invention is represented in the drawings and explained in more detail in the description that follows. FIG. 1 shows the progression of a communication between two control units, FIG. 2 shows a motor control in an immobilizer being set into operation, and FIG. 3 shows the encoding method.

DESCRIPTION OF THE EXEMPLARY EMBODIMENT

The communication between two control units 1 and 2 according to FIG. 1 takes place after the introduction of a key 20 into the first control unit, e.g. the immobilizer. This key signal 20 can be an encoded key, an encoding introduced by way of a chip card, a radio code, etc. The key signal 20 is detected by the immobilizer 4 and a signal 24 that a valid key is present is sent on the data line. This signal fulfills a wake-up function for the control unit 2. In step 3, the control unit generates a random bit sequence 21 of an $n_t$ bit length, stores this bit sequence and transmits it to the control unit 1. The number of bits in the random sequence must be selected as so great that a criminal who has possession of the device or the vehicle is not in a position to ascertain and record all possible solutions to all of the random bit sequences by trial and error. If one takes into consideration the length of the random bit sequence as a function of the number of possible permutations, for a random bit sequence 21 of one byte in length, the result is a sum of one times 265 bytes, with a length of 4 bytes, the result is already a number of four times $256^4=17.2$ GBytes. Storing such an amount of data is no longer easily possible, even for a thief. After the transmission of the random bit sequence, in step 5 or 6, i.e. in both control units at the same time, a cipher generator is initialized with the internal key 20'. In this connection, the key 20' is present in both the control unit 1 and the control unit 2. In the case of a correct initiation, the internal key is the same for both devices. However, this fact in particular must first be tested by means of the communication. The length of the key 20' must be selected as so great that its ascertainment by trial and error is precluded. Naturally, a criminal can accidentally obtain the right key even on the first attempt, but this can also just as easily happen on the last possible key. Therefore, the assumption is that on average, the criminal must try half of all possible keys in order to be successful. A comparison of the times that a potential criminal must expend in order to try out different keys is given below: With a key length of 1 byte, a criminal requires one half times $2^8$ seconds=128 seconds, if one assumes that the criminal makes one attempt per second. If the key length is increased to 2 bytes, already approx. 9 hours are required, when it is increased to 3 bytes, 97 days are needed, and at 4 bytes, 69 years are required. A length of 3 bytes therefore seems to be a sufficient key length. However, if one also takes into consideration the fact that parallelization and similar methods can multiply the speed ten-fold or even a hundred-fold, a value of 4 bytes is indicated for this use.

The key 20' must be accommodated in both the control unit 1 and the control unit 2 so that it cannot be read. It must also be impossible for it to be changed or overwritten by an unauthorized person. On the other hand, in the event of a necessary repair, it must also be possible to replace and re-initialize defective parts, e.g. control units or parts of control units. There is thus a higher cost for encoding and storing the key 20' in the electronics of the control units. The key code 22 Is generated in steps 7 and 8 with the internal key 20' and the random bit sequence 21. The key code 22 is used to encode a message 23 to be sent by the control unit 1 to the control unit 2 and vice versa. The first message of the control unit 1 is comprised of a text, in which at least $n_r$ bits are unchanging (redundant) and which is known to the control unit 2. In step 9, this resulting cryptogram is transmitted in the length of $n_s$ bits. The length $n_s$ is the length of the data that is exchanged as needed in an additionally encoded manner, plus the length $n_r$ of the redundant bits. The concatenation of the message with the key code in step 9 can take place through the bitwise addition modulo 2. In this instance, the additionally encoded data 20 sent cannot be understood and interpreted by unauthorized persons, but bits can still be intentionally produced at designated positions and possibly inverted in an undetected manner for the vehicle electronics and consequently commands can be falsified. However, this can be prevented by means of the additional introduction of a text return, which results in an error propagation. If the additional data is transmitted before the unchanging identification signal, then the latter is changed in an arbitrary falsification of the additional data and the manipulation attempt is detected in any case. The establishment of communication thus remains unsuccessful. In step 10, the unchanging bit sequence of $n_r$ bit length contained in the cryptogram that has been received and decoded is compared to the stored unchanging bit sequence and the unchanging $n_r$ bits are thus checked for correctness. In the next step 11, when the comparison result is correct, the remaining $n_s-n_r$ decoded data-carrying bits of the message 23 are output and e.g. a motor control unit releases the motor. If the comparison with the message 23 indicates that an error has occurred, e.g. by means of a manipulation attempt, the motor remains locked in step 12. In this manner, functions in the control units can be blocked.

FIG. 2 shows the progression of the communication states between an immobilizer and a motor control unit. The crypto-algorithm in the motor control unit is brought into an initial state by means of random influence quantities that are indicated by an arrow AR. The motor control unit 2 is thus put into the active state 14 while the immobilizer 1 is in a locked state 13. The cryptoalgorthm in the control unit 2 transmits its signal 16 in the form of at least 4 bytes to the control unit 1 of the immobilizer in order to initialize and crypto-synchronize 15 this control unit. The control unit 1 of the immobilizer is initialized 17 and begins with the transmission of an arbitrary amount ($n_s/8$) bytes of encoded data to the motor control 2 in a receiving state 18. The authenticity of the data is discerned by virtue of the fact that can be correctly decoded. In order to check this and thereby to permit travel, the data sent must contain sufficient redundancy $n_r$, i.e. data already known previously to the receiver. As an example, therefore, the encoded data sent by the immobilizer to the motor control should contain at least 16 bits of data known to the motor control, which the motor control must recognize after decoding. These can, for example, be two bytes with 00 or 11 or another fixed bit pattern. In encoded signals, these two bytes cannot be recognized; they are encoded differently each time. For this reason, they also cannot be falsified by a third party who does not know the key code 22. The 16 redundant bits do not absolutely need to be transmitted enclosed in the form of two bytes, they can also be arbitrarily encapsulated in the data to be transmitted in encoded form. They must then be individually verified in the motor control by means of comparison to the expected bit pattern.

FIG. 3 shows the actual crypto-algorithm which is comprised of four identical modules 27 connected in sequence. In FIG. 3, a + indicates the bitwise.addition modulo 2, a * indicates the multiplication modulo 257. The four bytes of the key code 22 are indicated with 28, the output bytes of the module 27 are indicated with 29. The input byte 26 of each module is first added bitwise modulo 2 to a byte 28 of the key code; in other words, each byte of the input byte is EXOR-concatenated with an equivalent byte of the respective key byte. In terms of both the calculation modulo 256 and the bitwise modulo 2 addition, the result is subjected to nonlinear permutations. These permutations can be carried out best with a table which, however, generally requires a lot of storage space in ROM. It is almost precisely as favorable to carry out the permutation by means of multiplication with an odd number between 3 and 253 modulo 257, wherein at the output, the value 256 is to be replaced by the value resulting from the input value 256, i.e. by means of (256 * F) modulo 257. F is an odd factor. With the exception of the last module 27, the output byte 29 of each module is supplied to the input of the succeeding one. The bitwise modulo 2 sum of the output bytes 29 constitutes the output byte 23, which is used for encoding and decoding by means of bitwise modulo 2 addition to the clear or secret byte.

OTHER EXEMPLARY EMBODIMENTS

The above-described crypto-algorithm can be modified in various ways: The odd factors $F_f$ can be selected in a wide range from 3 to 253 and can be chosen as different for each module 27. The choice of average values is advantageous. In the sequence, as has already been indicated above, other modules 27 can be added, which extends the length of the secret key, but also extends the length of the synchronization lead time and the length of the error propagation. If a lengthening of only the key code 22 is desired, without lengthening the synchronization, another sequence can be added in parallel, whose input is connected to the input of the first sequence and whose outputs are added bitwise modulo 2 to the outputs of the first. If the intent is to have an endlessly long error propagation, then after the synchronization has been achieved, the configuration of the sender side can be exchanged with that of the receiver side.

The method according to the invention permits an encoded communication of control units, of parts of the control units, or of individual electronic modules by way of a suitable connection. The method can be used for the transmission of individual control signals as well as for large quantities of data.

What is claimed is:

1. A method of secure data transmission between at least two control units arranged within a motor vehicle, said at least two control units being connected to each other via a data bus for the data transmission, said method comprising the steps of:

a) storing an encoded internal key (20') in each of said control units (1,2);

b) generating a random bit sequence in a receiving one (2) of said control units (1,2) from existing sensor data present in said receiving one (2) of said control units (1,2) in response to a wake-up signal (24) transmitted to said receiving one (2) of said control units (1,2) over the data bus from a transmitting one (1) of said control units (1,2) and transmitting the random bit sequence (21) from the receiving one (2) of the control units (1,2) on the data bus;

c) storing the random bit sequence (21) transmitted on the data bus in each of said control units;

d) producing a key code (22) with the random bit sequence (21) and the internal key (20') stored in each of said control units (1,2);

e) encoding a message (23) including redundant data with said key code (22) in the transmitting one (1) of said control units and transmitting said message (23) on said data bus;

f) receiving the message (23) produced in said transmitting one (1) of said control units and transmitted on said data bus in at least one other of said control units, wherein said at least one other of said control units includes said receiving one (2) of said control units;

g) reading and checking said message (23) received in said at least one other of said control units by means of the redundant data contained in said message (23) to verify correct encoding of said message with said key code; and h) generating a signal in said at least one other of said control units when said encoding of said message is found to be correct in step g).

2. The method as defined in claim 1, further comprising generating a key signal (20), transmitting the key signal (20) to said transmitting one (1) of said control units to put said transmitting one (1) of said control units in operation when said key signal is a valid signal, generating said wake-up signal (24) in said transmitting one of said control units in response to said key signal (20) and transmitting said wake-up signal (24) over said data bus to said receiving one (2) of said control units to initialize said receiving one (2) of said control units.

3. The method as defined in claim 2, wherein said transmitting one (1) of said control units is an immobilizer, said receiving one (2) of said control units is a motor control unit and said signal generated when said message is correctly encoded is a release signal transmitted to said motor control unit so that said motor control unit is released to permit operation of said motor vehicle.

4. The method as defined in claim 1, wherein said random bit sequence (21) has a length of at least four bytes.

5. The method as defined in claim 1, wherein said key code (22) comprises at least four bytes.

6. The method as defined in claim 1, further comprising adding an input byte (26) to a byte of said key code (28) bitwise, modulo 2, in a module (27) to obtain an unpermuted result, subjecting the unpermuted result to a permutation to obtain a permuted result, supplying the permuted result to a following module (27) and adding the permuted result to another byte of said key code (28) bitwise, modulo 2, to obtain another unpermuted resutt, subjecting said another unpermuted result to another permutation to obtain another permuted results, repeating until all bytes of said key code (28) are added bitwise, modulo 2, and combined to obtain other permuted results and combining the permuted results from each of said modules to obtain said message (23).

7. The method as defined in claim 6, wherein said permutation takes place by multiplication modulo 257 of said input byte (26) with a factor ($F_i$).

8. The method as defined in claim 7, wherein said factor ($F_i$) is freely selected and between 3 and 253 for each of said modules (27).

9. The method as defined in claim 1 wherein said encoding occurs by means of a plurality of cryptoenerator sequences operating in parallel with each other.

10. The method as defined in claim 1, further comprising generating an error message when said message (23) is not correctly encoded.

11. The method as defined in claim 1 or 10, further comprising interrupting operations of said control units when said message (23) is not correctly encoded.

* * * * *